Aug. 1, 1961  F. C. HABERLAND ET AL  2,994,230
GEAR DESIGN
Filed Feb. 4, 1959  2 Sheets-Sheet 1

Inventors:
Fred C. Haberland
and Eugene A. Moore
By: Frank C. Parker Atty.

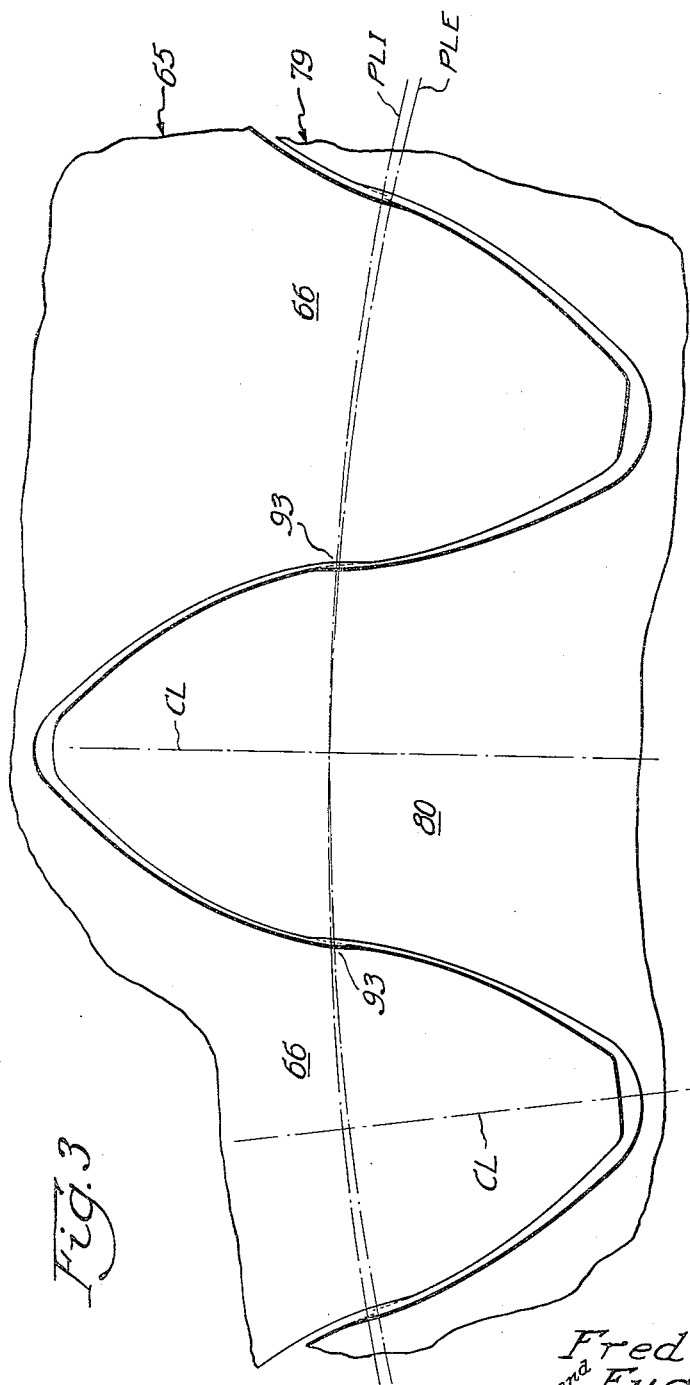

United States Patent Office 2,994,230
Patented Aug. 1, 1961

2,994,230
GEAR DESIGN
Fred C. Haberland, Cleveland, and Eugene A. Moore, Maple Heights, Ohio, assignors to Borg-Warner Corporation, Chicago, Ill., a corporation of Illinois
Filed Feb. 4, 1959, Ser. No. 791,075
8 Claims. (Cl. 74—462)

This invention relates to an improved gear design and, in particular, to an improved contour design for the teeth of gears utilized in the particular application of internal-external gear type pumps or motors.

Normally, each gear for the internal-external gear type pump or motor has a plurality of equally spaced teeth disposed about the respective pitch line circle thereof. The side-face contour of each gear tooth is defined by a pair of mirror edges disposed on opposite sides of the center line of the respective tooth. Generally, each edge is formed in such a manner that there is an addendum portion, i.e., the portion of the edge which extends from the pitch line circle to the tip of the tooth at the center line thereof, and a dedendum portion, i.e., the portion of the edge that extends from the pitch line circle to the root of the tooth, the addendum and dedendum portions intersecting each other at the pitch line circle. The addendum and dedendum portions of the edges of the gear teeth are formed by cutting a gear blank perpendicularly with respect to the opposed parallel side faces thereof along an outline of a predetermined gear tooth pattern traced on one of the side faces of the gear blank. The gear tooth pattern usually comprises a series of interconnected involute or cycloidal type generated curves or variations thereof disposed about a theoretical pitch line circle concentrically disposed about a desired axis of rotation for the gear, the axis passing axially through the center of the gear. The teeth, thus formed, each have leading and trailing addendum and dedendum faces perpendicularly disposed with respect to and between the gear side faces, the leading and trailing faces respectively defining addendum and dedendum edge portions with the gear side faces. It is to be understood, of course, that when manufacturing gears with a predetermined tooth design in production quantities, the milling or hobbing machines are set to automatically cut each gear blank without the aid of a traced pattern on the individual gear blanks. However, when designing a new gear, the above-mentioned procedure is usually followed. When the gear tooth pattern comprises a series of interconnected involute curves, the resulting structure is referred to as an involute gear, and when cycloidal type curves are utilized, the resulting structure is generally referred to as a cycloidal gear.

In internal-external gear pumps, the internal and external gears are mounted within a pumping chamber and are adapted to rotate about axes respectively passing axially through the theoretical centers of the gears, the axis of rotation of each gear being parallel and spaced from the other gear axis of rotation in such a manner that each tooth of each gear, as the gears rotate about their axes, will come into full meshing relation within the tooth space between an adjacent pair of gear teeth of the other gear when the center line of that particular gear tooth is superimposed upon a straight line passing through the centers of the gears. Generally, the diameter of the outside circle of the external gear, i.e., the circle generated by a radius extending from the center of the external gear to the tips of the teeth thereof, is smaller than the diameter of the inside circle of the internal gear, i.e., the circle generated by a radius extending from the center of the internal gear to the tips of the teeth thereof. In this manner, only certain of the teeth of each gear will be in various stages of meshing relationship at any one time during rotation whereby the remaining teeth of each gear will be in completely unmeshed relation. One of the gears, usually the external gear, is interconnected with a power source whereby the gear is rotated about its axis of rotation. This gear, in turn, through the meshing relationship of the gear teeth, drives the other gear about its axis of rotation. As each tooth of the external gear, during rotation thereof, approaches initial meshing relation between a pair of adjacent internal gear teeth, the trailing addendum face of the external gear tooth comes into sealing contact with the leading addendum face of the trailing internal gear tooth of the particular pair of teeth thereof. The line of contact between the two addendum faces moves from the tips of the respective teeth, at the point of initial contact, toward the respective pitch line circle as the teeth approach full meshing relation. As the teeth rotate past the point of full meshing relation, the leading addendum face of the external gear tooth makes driving and sealing contact with the trailing addendum face of the leading internal gear tooth of the particular pair of teeth thereof. The line of driving and sealing contact between the two addendum faces moves from the pitch line circles of the respective gears, at the point of initial driving contact, toward the respective gear teeth tips as the teeth approach full unmeshing relation. Separate sealed pockets are formed between successive pairs of gear teeth during the meshing relationship, the pockets diminishing in size from the point of initial sealing contact to where the gear teeth are in full meshing relation, and progressively increase in size from the point of initial driving contact to where the teeth unmesh completely.

Fluid to be pumped is conveyed to the pumping chamber by a pump inlet means. The inlet means conveys the fluid to where the above-mentioned gear teeth pockets are increasing in size and are causing a vacuum condition, whereby the fluid is drawn into the pumping chamber. The fluid within the pumping chamber, in turn, becomes completely trapped between successive pairs of the gear teeth as they begin their initial meshing relation. The fluid thus trapped is forced out of the pockets as they diminish in size into a pump outlet means.

It has been found that when utilizing internal and external gears formed with cycloidal type teeth in fluid pumps or motors of the above-described type, a large number of the teeth thereof are adapted to be in various stages of meshing relation, thereby providing a pump having a relatively large capacity in relation to the size of the gears. However, the prior known cycloidal tooth designs resulted in an extremely close engagement between the gear teeth faces of the fully meshed gear teeth. This required that the alignment between the axes of rotation of the internal and external gears be rigidly maintained within the pump assembly whereby any deviations therefrom during operation would result in damage to the gear teeth as well as binding of the gears and subsequent loss of pump efficiency. Because extremely close tolerances not only must be maintained in the pump structure, but also in the manufacture of the gears to provide the desired results, manufacturers of internal-external gear type pumps generally utilize gears of the involute design where such extremely close tolerances are not required.

Various attempts have been made to modify the cycloidal gears in order to utilize the advantage of a high capacity arrangement, not only for fluid internal-external gear type pumps or motors, but also for other well known applications thereof. In order to overcome the previously mentioned disadvantage of cycloidal type gear tooth design, it has been found necessary to provide backlash for the gear teeth whereby the particular theoretical alignment between the axes of rotation of the gears may vary within certain limits during operation without resulting in subsequent damage to the assembly or gears.

It is, therefore, an object of this invention to provide an improved cycloidal type gear tooth design.

It is another object of this invention to provide an improved cycloidal type gear tooth design for a gear where back-lash is provided for each tooth.

Another object of this invention is to provide an improved gear design where each gear tooth comprises a pair of mirror edges defining the contour thereof and being disposed on opposite sides of the center line of the tooth, each edge comprising an addendum portion and a dedendum portion, the dedendum portion being superimposed upon a line extending from a starting point on the pitch line circle and the addendum portion comprising a first portion and a second portion, the first portion being superimposed on a line extending from the starting point of the dedendum portion to a point on a line generated by a fixed point on a circle rolled in contact with the pitch line circle, the point on the circle starting on the pitch line circle at a greater distance from the center line than the starting point of the dedendum line, the second portion of the addendum being superimposed on the line generated by the point on the circle and extending from the first portion toward the center line of the tooth.

A further object of this invention is to provide an improved cycloidal type gear design where each gear tooth comprises a pair of mirror edges defining the contour thereof and being disposed on opposite sides of the center line of the tooth, each edge comprising an addendum portion and a dedendum portion, the dedendum portion being superimposed upon a line generated by a fixed point on a first circle rolled without slippage in contact with one side of the pitch line circle of the gear, the addendum portion comprising a first portion and a second portion, the first portion interconnecting the dedendum portion with the second portion, the first portion being superimposed on a line extending from the starting point of the dedendum portion to a point on a curve generated by a fixed point on a second circle rolled in contact with the pitch line circle in the opposite direction and on the other side thereof from the dedendum describing circle, the point on the second rolling circle starting on the pitch line circle at a greater distance from the center line than the point on the first rolling circle, the second portion being superimposed on the second generated curve and extending from said first portion toward the center line of the tooth.

Another object of this invention is to provide an external gear with a plurality of teeth disposed about the pitch line circle thereof, each tooth having a contour defined in the manner set forth in the preceding object.

Another object of this invention is to provide an internal gear with a plurality of teeth disposed about the pitch line circle thereof, each tooth having a contour defined in the manner set forth in the second preceding object.

A further object of this invention is to provide in a pump or the like, an internal gear having a plurality of teeth disposed about the pitch line circle thereof, an external gear having a plurality of teeth disposed about the pitch line circle thereof, the external gear being disposed within the internal gear whereby certain of the gear teeth are in meshing relation, each tooth of each gear having a contour defined in the manner set forth in the third preceding object.

Other objects, advantages, and uses of this invention will become apparent from a reading of the following specification taken in connection with the accompanying drawings forming a part thereof and wherein:

FIGURE 3 illustrates, in a fragmentary view, the meshing relationship of the teeth of the gears illustrated in FIGURES 1 and 2.

Figure 1:
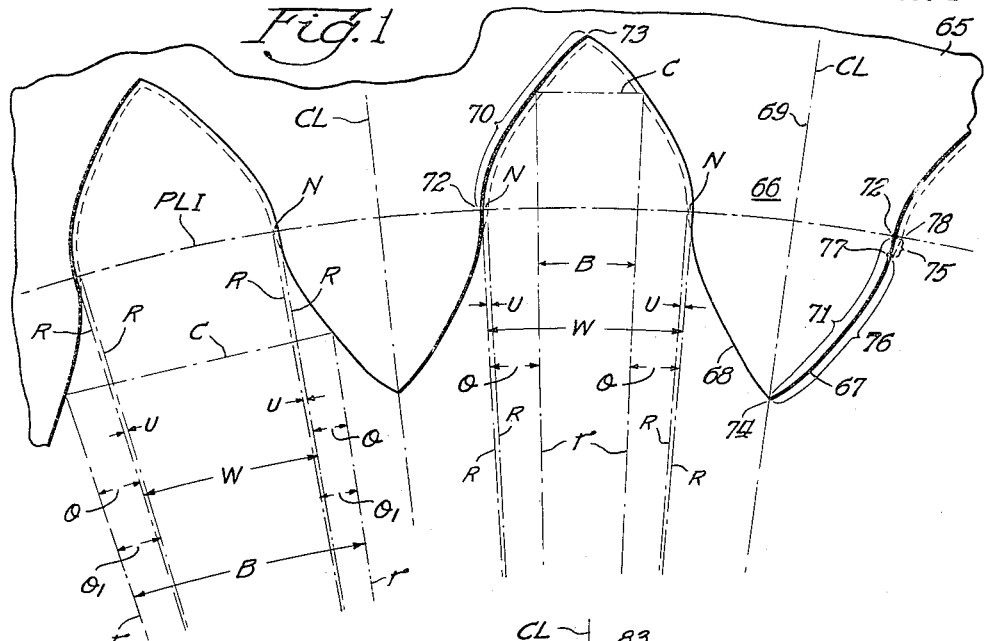
FIGURE 1 illustrates, in a fragmentary view, an internal gear having teeth formed in accordance with this invention.

As shown in FIGURE 1, the internal gear 65 has a plurality of teeth 66 disposed about the pitch line circle PLI thereof. Each tooth 66 has a pair of mirror edges 67 and 68 disposed on opposite sides of a center line 69 thereof. Each edge 67 and 68 has a dedendum portion 70 and an addendum portion 71, the dedendum portion 70 extending from a point 72 on the pitch line circle PLI to the bottom 73 of the gullet between adjacent teeth 66 where adjacent dedendum portions 70 intersect, and the addendum portion 71 extending from the point 72 on the pitch line circle PLI to the tip 74 of the tooth where the mirror edges 67 and 68 intersect the center line 69 thereof. The dedendum portion 70 of each edge 67 and 68 of each tooth 66 may be defined in the same manner as the corresponding portions of the internal gear 19, i.e., by being superimposed on an epicycloid or curve traced by a fixed point on the circumference of a circle rolled without slipping on the pitch line circle PLI, the curve starting at the point 72 on the pitch line circle PLI and following the dedendum portion 70 to the gullet bottom 73. The addendum portions 71 have been modified from the corresponding portions of the internal gear 19, and each comprises a first portion 75 and a second portion 76. The first portion 75 corresponds to being superimposed on a straight line extending a predetermined distance from the point 72 on the pitch line circle PLI to a point 77 on a hypocycloid or curve generated by a fixed point on the circumference of a circle rolled without slipping on the inside of the pitch line circle PLI, the hypocycloid having a starting point 78 on the pitch line circle PLI and extending to the center line 69 at the tooth tip 74. The starting point 78 of the hypocycloid is spaced a greater distance from the center line 69 than the starting point 72 of the epicycloid describing the dedendum portion 70. The second portion 76 of the addendum portion 71 corresponds to being superimposed on the hypocycloid and extends from the point 77 to the tooth tip 74.

Figure 2:
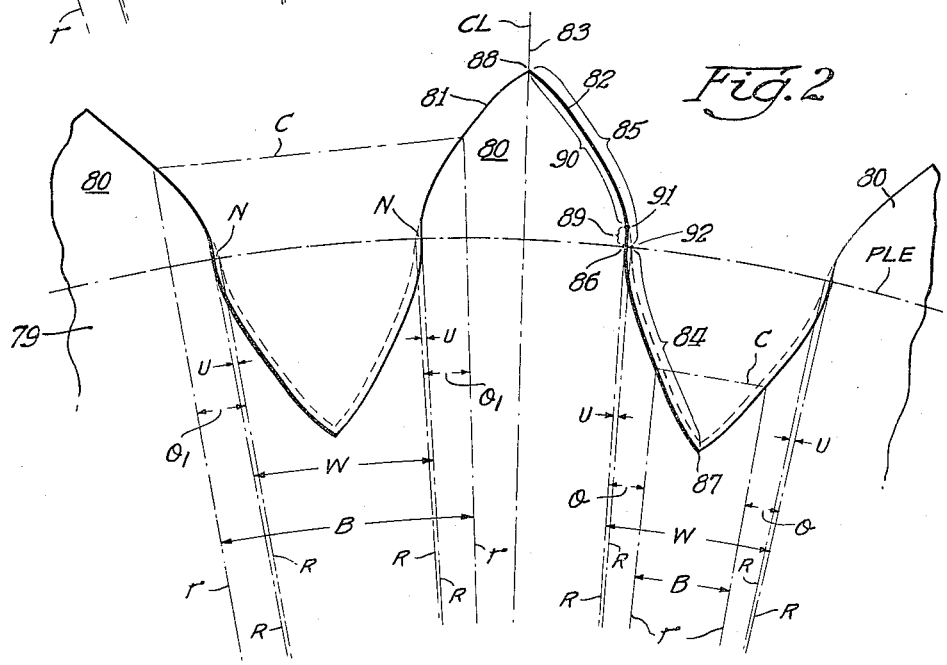
FIGURE 2 illustrates, in a fragmentary view, an external gear having teeth formed in accordance with this invention.

As shown in FIGURE 2, an external gear 79, formed in accordance with the teachings of this invention, is modified in the same manner as the internal gear 65 and comprises a plurality of teeth 80 disposed about the pitch line circle PLE thereof. Each tooth 80 has a pair of mirror edges 81 and 82 disposed on opposite sides of a center line 83 thereof. Each edge 81 and 82 has a dedendum portion 84 and an addendum portion 85, the dedendum portion 84 extending from a point 86 on the pitch line circle PLE to the bottom 87 of the gullet between adjacent teeth 80 where adjacent dedendum portions 84 intersect and the addendum portion 85 extending from the point 86 on the pitch line circle PLE to the tip 88 of the tooth where the mirror edges 81 and 82 intersect the center line 83 thereof. The dedendum portion 84 of each edge 81 and 82 of each tooth 80 corresponds to being superimposed on a hypocycloid or curve traced by a fixed point on the circumference of a circle rolled without slipping on the inside of the pitch line circle PLE, the hypocycloid defining the dedendum portions 84 in the same manner as the corresponding dedendum portions of the external gear 20. The hypocycloid extends from the point 86 on the pitch line circle and follows the dedendum portion 84 to the gullet bottom 87. The addendum portions 85 of the external gear teeth 80 have been modified in the same manner as the addendum portions 71 of the internal gear 65 and each comprises a first portion 89 and a second portion 90. The first portion 89 corresponds to being superimposed on a straight line extending a predetermined distance from the point 86 on the pitch line circle PLE to a point 91 on an epicycloid or curve generated by a fixed point on the circumference of a circle rolled without slipping on the outside of the pitch line circle PLE, the epicycloid having a starting point 92 on the pitch line circle PLE and extending to the center line 83 at the tooth tip 88. The starting point 92 of the epicycloid is spaced a greater distance from the center line 83 than the starting point 86 of the hypocycloid describing the dedendum portion 84. The second portion 90 of the addendum portion 85 corresponds to being superimposed on the epicycloid and extends from the point 91 to the tooth tip 88.

Since the internal gear 65 is being designed to cooperate with the external gear 79, the radii of the addendum describing circles for both gears are the same and are slightly smaller than the radii of the dedendum describing circles of the gears in the same manner and for the same reasons set forth for the gears 19 and 20 above. Similarly, the gullet bottoms 74 and 87 and tips 73 and 88 of the internal and external gear teeth 66 and 80 respectively may be rounded so as to avoid sharp edges thereof and to facilitate the cutting thereof during machining.

The distance between the starting point 72 of the dedendum describing circle of the internal gear 65 and the starting point 78 of the addendum describing circle is designated by the reference letter N. Similarly, the distance between the starting point 86 of the dedendum describing circle of the external gear 79 and the starting point 92 of the addendum describing circle is designated by the reference letter N. The distance N may be equal for both gears 65 and 79.

As shown in FIGURE 3, when certain of the teeth 80 of the external gear 79 are in full meshing relation between adjacent pairs of teeth 66 of the internal gear 65, there is a clearance space or back lash 93 between adjacent faces of the gear teeth. This clearance space 93 is equal to 2N when measured along the substantially superimposed pitch line circles PLI and PLE and permits for variations in the alignment of the gears 65 and 79 with respect to each other without subsequent binding of the gears or gear tooth damage during operation thereof. This feature of providing back lash 93 between the meshing gear teeth of an internal-external gear set is an important feature of this invention.

As previously stated, it is desirable to know the chordal distance or tooth space between adjacent teeth on each gear at any particular distance from the respective gear center in order to properly set up the automatic milling or hobbing machine for mass producing the gears according to the predetermined pattern. Therefore, because of the back lash 93 provided for the gears 65 and 79, the angle W equals the angle included between a pair of radii R extending respectively from the particular gear center to where the adjacent gear teeth edge portions intersect the respective pitch line circle, the angle $\theta$ equals the angle included between a radius R that intersects the respective gear tooth edge at the pitch line circle thereof and a line $r$ where the line $r$ intersects the same gear edge at the point where the chord C to be measured intersects the gear edge, and an angle U equals the angle included between a pair of radii R extending respectively from the particular gear center to where the starting points of the circles describing the addendum and dedendum portions of the same gear edge are located on the pitch line circle thereof.

The value of the angle U may be determined for either gear 65 or 79 as follows:

(1) $$U = \frac{N180°}{\pi R}$$

where:

$N$ = the arc on the respective pitch line circle between the starting points of the circles describing the addendum and dedendum portions of the same gear tooth edge; and $R$ = the radius of the particular gear tooth pitch line circle.

Therefore, since the starting point of the circle describing the second portions 76 and 90 of the respective pair of mirror edges 67, 68 and 81, 82 of each gear tooth has been modified by the distance N, the angle B when measuring the chordal tooth space C between adjacent addendum second portions 71 of the internal gear teeth 66 and between adjacent addendum second portions 90 of the external gear teeth 80 may be determined by the following formula:

(2) $$B = W - 2U + 2\theta_1$$

or:

(3) $$B = W - \frac{N360°}{R} + 2\theta_1$$

where:

$B$ = the angle included between a pair of lines $r$ where each line $r$ extends from the center of the respective gear to the point on one of the adjacent tooth edges where the chord C intersects the same;

$W$ = the angle included between a pair of radii R extending respectively from the particular gear center to where the adjacent gear teeth edge portions intersect the respective pitch line circle;

$U$ = the angle included between a pair of radii R extending respectively from the particular gear center to where the starting points of the circles describing the addendum and dedendum portions of the same gear edge are located on the pitch line circle thereof;

$\theta_1$ = the angle included between a radius R extending from the respective gear center to the starting point on the respective pitch line circle of the circle describing the addendum portion and the line $r$ extending from the respective gear center to the same addendum portion where the chord C intersects the same.

$R$ = the radius of the particular pitch line circle; and $N$ = the distance measured on the respective gear pitch line circle between the starting points of the circles describing the addendum and dedendum portions of the same gear edge.

Since the angle $\theta$, as shown in FIGURES 1 and 2, when measuring the chordal tooth space C between adjacent addendum portions of either the internal or external gear, is the angle included between the radius R extending from the respective gear center to where the tooth edge intersects the pitch line circle and the line $r$ extending to the same edge where the chord C intersects the same, the angle $\theta$ utilized therein must be the angle included between a radius R extending from the particular gear center to the starting point of the addendum describing circle on the pitch line circle and a line $r$ extending from the gear center to where the chord C intersects the same edge. Therefore, it can be seen that in FIGURES 1 and 2, the angle $\theta_1$ corresponds to the chordal distance C between adjacent addendum portions. $\theta_1$ can be determined from the following formula:

(4) $$\theta_1 = \theta + U$$

In view of the above, it can be seen that the chordal tooth space C for the improved gears of this invention, illustrated in FIGURES 1 and 2, can be determined from the following.

When measuring the chordal tooth space C between adjacent second and arcuate addendum portions of either the internal or external gear, 65 or 79, or other gears formed in accordance with the teachings of this invention, the following formula applies:

(5) $$C = 2r \sin \frac{1}{2}\left(W - \frac{N360°}{\pi R} + 2\theta_1\right)$$

and when measuring the chordal tooth space C between adjacent dedendum portions of either the internal gear or external gear, 65 or 79, the following formula applies:

(6) $\quad C = 2r \sin \frac{1}{2}(W - 2\theta)$ $C$ = chordal tooth space;
$r$ = distance of a line extending from the center of said gear to a point on the tooth edge where the chord C intersects the same;
$R$ = the radius of the pitch line circle;
$W$ = the angle between a pair of radii, where each radius R intersects one of the adjacent edges at the pitch line circle;
$\theta$ = the angle between r and R, where R intersects the respective edge at the pitch line circle;
$N$ = a constant; and $$\theta_1 = \theta + \frac{180° N}{\pi R}$$

When measuring the chordal tooth space C between adjacent second or arcuate addendum edge portions of the internal gear teeth 66, utilizing the Formula 5 above, the value for $r$ can be determined from:

(7) $\quad r = \sqrt{R^2 - 2a(R-a) + 2a(R-a)\cos E}$ where:

$R$ = the radius of the particular gear pitch line circle;
$a$ = the radius of the particular gear tooth edge portion describing circle; and
$E$ = the angle of rotation of the particular describing circle when generating a curve extending from the pitch line circle of the particular gear to where the chord C intersects the same.

The value for $\theta_1$ can be determined from the following formula:

(8) $\quad \theta_1 = \frac{aE}{R} - \tan^{-1}\left(\frac{a \sin E}{R - a(1 - \cos E)}\right)$ Similarly, when measuring the chordal tooth space C between adjacent second or arcuate addendum edge portions of the external gear teeth 80, utilizing the Formula 5 above, the value for $r$ can be determined from the formula:

(9) $\quad r = \sqrt{2a(R+a) + R^2 - 2a(R+a)\cos E}$ where:

$R$ = the radius of the particular gear pitch line circle;
$a$ = the radius of the particular gear tooth edge portion describing circle; and
$E$ = the angle of rotation of the particular describing circle when generating a curve extending from the pitchline circle of the particular gear to where the chord C intersects the same.

The value for $\theta_1$ can be determined from the following formula:

(10) $\quad \theta_1 = \frac{aE}{R} - \tan^{-1}\left(\frac{a \sin E}{R + a(1 - \cos E)}\right)$ To measure the chordal tooth space C between adjacent dedendum edge portions of the internal gear teeth 66, utilizing the Formula 6 above, the values for $r$ and $\theta$ can be determined from the Formula 7 and the following formula:

(11) $\quad \theta_1 = \frac{aE}{R} - \tan^{-1}\left(\frac{a \sin E}{R + a(1 - \cos E)}\right)$ where:

$a$ = the radius of the particular gear tooth edge portion describing circle;
$E$ = the angle of rotation of the particular describing circle when generating a curve extending from the pitchline circle of the particular gear to where the chord C intersects the same; and
$R$ = the radius of the particular gear pitch line circle.

Similarly, to measure the chordal tooth space C between adjacent dedendum edge portions of the external gear teeth 80, utilizing the Formula 6 above, the values for $r$ and $\theta$ can be determined from the Formula 9 and the following formula:

(12) $\quad \theta_1 = \frac{aE}{R} - \tan^{-1}\left(\frac{a \sin E}{R - a(1 - \cos E)}\right)$ where:

$a$ = the radius of the particular gear tooth edge portion describing circle;
$E$ = the angle of rotation of the particular describing circle when generating a curve extending from the pitch line circle of the particular gear to where the chord C intersects the same; and
$R$ = the radius of the particular gear pitch line circle.

It should be understood that the distance N, and the length of the first portions 75 and 89 of the addendum edge portions of the gear teeth may be relatively small, whereas, as illustrated in FIGURES 1, 2, and 3 such distances have been exaggerated for purpose of illustration.

A typical internal-external gear set that has performed satisfactory and was formed in accordance with the teachings of this invention was made with the following dimensions:

Radius R of the pitch line circle of the internal gear _____ inches__ = 1.8125
Radius R of the pitch line circle of the external gear _____ inches__ = 1.5000
Radius $a$ of the circle describing the dedendum edge portions of the teeth of both gears inch__ = .17187
Radius $a'$ of the circle describing the addendum edge portion of the teeth of both gears inch__ = .15625
Number of teeth on the internal gear _____ = 29
Number of teeth on the external gear _____ = 24
Length of the first or straight portion of the addendum edge of each external gear tooth inch__ = .0145
Length of the first or straight portion of the addendum edge of each internal gear tooth inch__ = .0095
The distance N for both gears _____ do ____ = .001

In view of the above, it can be seen that this invention provides for backlash between meshing teeth of an internal-external cycloidal type gear set when utilized in a fluid pump or motor or other applications whereby the alignment between the respective axes of rotation of the gears may vary within certain limits without resulting in damage to the gear teeth or the assembly.

As previously stated, since only the addendum portions of the gear teeth, when utilizing an internal-external gear set for a hydraulic motor or pump, perform the driving and sealing relation between the gear teeth, the dedendum portions of the teeth could be formed other than in the manner previously set forth or with the same accuracy as the addendum portions. Therefore, the dedendum portions could be formed by any suitable pattern as long as the dedendum portions interconnect the respective addendum portions at the pitch line circle and the addendum portions are formed in the manner previously described to provide the necessary backlash between the meshing gear teeth.

While reference has been made to various dimensions, it is to be understood that this is for the purpose of illustration and not limitation.

Further, while this invention has been disclosed with only one embodiment thereof, it is to be understood that this is by way of example rather than limitation, and it is intended that the invention be defined by the appended claims.

What is claimed is:

1. A gear having a pitch line circle and having a plurality of spaced teeth disposed about said pitch line circle, each tooth having a center line and a pair of mirror edges defining the contour thereof and disposed on opposite sides of said center line, each edge having a dedendum portion and an addendum portion, said dedendum portion substantially defining a hypocycloid, said hypocycloid starting at a point spaced a predetermined distance from said center line on said pitch line circle and terminating at a second predetermined distance from said center line, said addendum portion including a first portion and a second portion, said first portion defining a line extending from said starting point of said hypocycloid to an epicycloid having a starting point spaced a greater distance from said center line on said pitch line circle than said hypocycloid, said second portion defining said epicycloid and extending from said first portion to a predetermined point on said epicycloid.

2. A gear having a pitch line circle and having a plurality of spaced teeth disposed about said pitch line circle, each tooth having a center line and a pair of mirror edges defining the contour thereof and disposed on opposite sides of said center line, each edge having a dedendum portion and an addendum portion, said dedendum portion substantially defining an epicycloid, said epicycloid starting at a point spaced a predetermined distance from said center line on said pitch line circle and terminating at a second predetermined distance from said center line, said addendum portion including a first portion and a second portion, said first portion defining a line extending from said starting point of said epicycloid to a hypocycloid having a starting point spaced a greater distance from said center line on said pitch line circle than said epicycloid, said second portion defining said hypocycloid and extending from said first portion to a predetermined point on said hypocycloid.

3. An external gear having a pitch line circle and a center of rotation, said external gear having a plurality of spaced teeth disposed about said pitch line circle, each tooth having a pair of mirror edges defining the contour thereof, each edge having a dedendum portion and an addendum portion, said addendum portion including a first portion and a second portion, said first portion interconnecting said dedendum portion and said second portion, said teeth being so constructed and arranged that the chordal tooth space between adjacent second portions of adjacent teeth is substantially defined by $$C = 2r \sin \frac{1}{2}\left(W - \frac{360°N}{\pi R} + 2\theta_1\right)$$

and between adjacent dedendum portions of adjacent teeth is substantially defined by $$C = 2r \sin \tfrac{1}{2}(W - 2\theta)$$

where:

$C$ = chordal tooth space,
$r$ = distance of a line extending from the center of said gear to a point on the tooth edge where the chord C intersects the same,
$R$ = the radius of the pitch line circle,
$W$ = the angle between a pair of radii, where each radius R intersects one of the adjacent edges at the pitch line circle,
$\theta$ = the angle between $r$ and R, where R intersects the respective edge at the pitch line circle,
$N$ = a constant, and $$\theta_1 = \theta + \frac{180°N}{\pi R}$$

whereby backlash is provided for each tooth by said first portions thereof.

4. An internal gear having a pitch line circle and a center of rotation, said internal gear having a plurality of spaced teeth disposed about said pitch line circle, each tooth having a pair of mirror edges defining the contour thereof, each edge having a dedendum portion and an addendum portion, said addendum portion including a first portion and a second portion, said first portion interconnecting said dedendum portion and said second portion, said teeth being so constructed and arranged that the chordal tooth space between adjacent second portions of adjacent teeth is substantially defined by $$C = 2r \sin \frac{1}{2}\left(W - \frac{360°N}{\pi R} + 2\theta_1\right)$$

and between adjacent dedendum portions of adjacent teeth is substantially defined by $$C = 2r \sin \tfrac{1}{2}(W - 2\theta)$$

where:

$C$ = chordal tooth space,
$r$ = distance of a line extending from the center of said gear to a point on the tooth edge where the chord C intersects the same,
$R$ = the radius of the pitch line circle,
$W$ = the angle between a pair of radii, where each radius R intersects one of the adjacent edges at the pitch line circle,
$\theta$ = the angle between $r$ and R, where R intersects the respective edge at the pitch line circle,
$N$ = a constant, and $$\theta_1 = \theta + \frac{180°N}{\pi R}$$

whereby backlash is provided for each tooth by said first portions thereof.

5. A gear having a pitch line circle and having a plurality of spaced teeth disposed about said pitch line circle, each tooth having a center line and a pair of mirror edges defining the contour thereof and disposed on opposite sides of said center line, each edge having a dedendum portion and an addendum portion, said dedendum portion being defined by a line starting at a point spaced a predetermined distance from said center line on said pitch line circle and terminating at a second predetermined distance from said center line, said addendum portion including a first portion and a second portion, said first portion defining a line extending from said starting point of said dedendum line to an epicycloid having a starting point spaced a greater distance from said center line on said pitch line circle than said dedendum line, said second portion defining said epicycloid and extending from said first portion to a predetermined point on said epicycloid.

6. A gear having a pitch line circle and having a plurality of spaced teeth disposed about said pitch line circle, each tooth having a center line and a pair of mirror edges defining the contour thereof and disposed on opposite sides of said center line, each edge having a dedendum portion and an addendum portion, said dedendum portion being defined by a line starting at a point spaced a predetermined distance from said center line on said pitch line circle and terminating at a second predetermined distance from said center line, said addendum portion including a first portion and a second portion, said first portion defining a line extending from said starting point of said dedendum line to a hypocycloid having a starting point spaced a greater distance from said center line on said pitch line circle than said dedendum line, said second portion defining said hypocycloid and extending from said first portion to a predetermined point on said hypocycloid.

7. An external gear having a pitch line circle and a center of rotation, said external gear having a plurality of spaced teeth disposed about said pitch line circle, each tooth having a pair of mirror edges defining the contour thereof, each edge having a dedendum portion and an addendum portion, said addendum portion including a first portion and a second portion, said first portion interconnecting said dedendum portion and said second portion, said teeth being so constructed and arranged that the chordal tooth space between adjacent second portions of adjacent teeth is substantially defined by $$C = 2r \sin \frac{1}{2}\left(W - \frac{360°N}{\pi R} + 2\theta_1\right)$$

where:

$C$ = chordal tooth space,
$r$ = distance of a line extending from the center of said gear to a point on the tooth edge where the chord C intersects the same,
$R$ = the radius of the pitch line circle,
$W$ = the angle between a pair of radii, where each radius R intersects one of the adjacent edges at the pitch line circle,
$\theta$ = the angle between $r$ and R, where R intersects the respective edge at the pitch line circle,
$N$ = a constant, and $$\theta_1 = \theta + \frac{180°N}{\pi R}$$

whereby backlash is provided for each tooth by said first portions thereof.

8. An internal gear having a pitch line circle and a center of rotation, said internal gear having a plurality of spaced teeth disposed about said pitch line circle, each tooth having a pair of mirror edges defining the contour thereof, each edge having a dedendum portion and an addendum portion, said addendum portion including a first portion and a second portion, said first portion interconnecting said dedendum portion and said second portion, said teeth being so constructed and arranged that the chordal tooth space between adjacent second portions of adjacent teeth is substantially defined by $$C = 2r \sin \frac{1}{2}\left(W - \frac{360°N}{\pi R} + 2\theta_1\right)$$

where:

$C$ = chordal tooth space,
$r$ = distance of a line extending from the center of said gear to a point on the tooth edge where the chord C intersects the same,
$R$ = the radius of the pitch line circle,
$W$ = the angle between a pair of radii, where each radius R intersects one of the adjacent edges at the pitch line circle,
$\theta$ = the angle between $r$ and R, where R intersects the respective edge at the pitch line circle,
$N$ = a constant, and $$\theta_1 = \theta + \frac{180°N}{\pi R}$$

whereby backlash is provided for each tooth by said first portions thereof.

References Cited in the file of this patent
UNITED STATES PATENTS
1,690,931     Hammar _____ Nov. 6, 1928